June 1, 1926.  
F. KUHN  
AUTO LICENSE PLATE HOLDER  
Filed Jan. 30, 1925

1,586,904

INVENTOR  
F. KUHN  
BY  
ATTORNEYS

Patented June 1, 1926.

1,586,904

UNITED STATES PATENT OFFICE.

FRANK KUHN, OF QUINCY, ILLINOIS.

AUTO LICENSE-PLATE HOLDER.

Application filed January 30, 1925. Serial No. 5,841.

My invention relates to improvements in auto license plate holders, and it consists in the combinations, constructions, and arrangements herein described and claimed.

An object of my invention is to provide an auto license plate holder which is especially constructed to permit the license plate to be quickly attached to the license carrying bracket, or removed therefrom, this making the device especially adaptable for use by auto dealers and individual owners of cars.

A further object of my invention is to provide an auto license plate holder which is extremely simple in construction, and constructed so as to be quickly released, yet at the same time positively locked in place when once assembled.

Other objects and advantages will appear in the following specification, and the novel features of the invention will be particularly pointed out in the appended claims.

My invention is illustrated in the accompanying drawings forming part of this application, in which—

Figure 1:
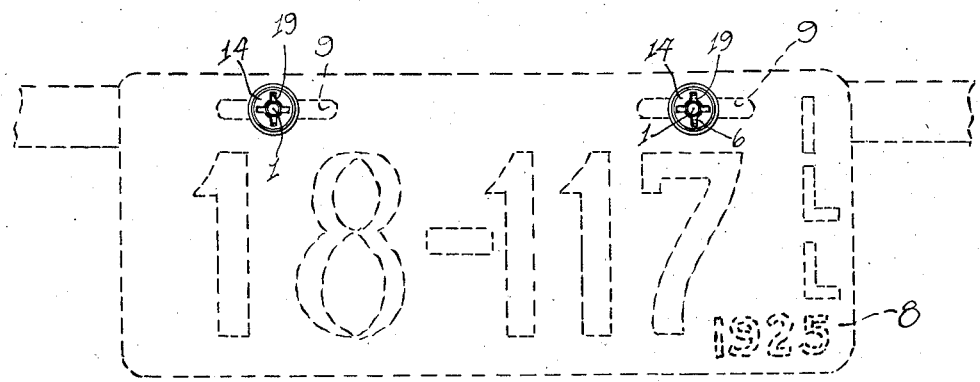
Figure 2:
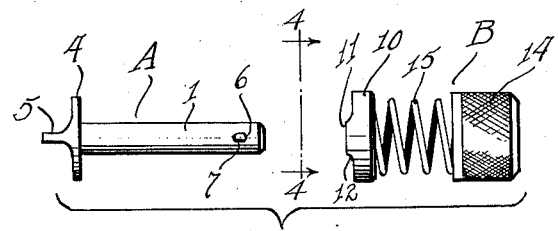
Figure 3:
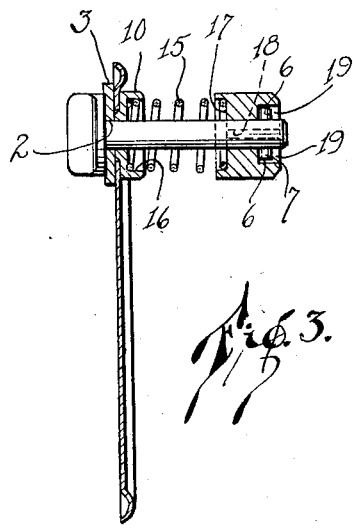
Figure 4:
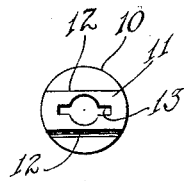

Figure 1 is a front view of the device, showing it operatively applied to a license plate and bracket, Figure 2 is a side elevation, showing the device disassembled, Figure 3 is a sectional view through the device, showing how the device locks the license plate to the license bracket, and Figure 4 is a section along the line 4—4 of Figure 2.

In carrying out my invention I provide a license plate holder which comprises two main parts, A and B. The part A resembles a bolt 1 that is adapted to be inserted through an opening 2 in a license bracket 3, as shown in Figure 3. One end of the bolt 1 is provided with a head 4, the head having a winged portion 5 for a purpose hereinafter described. The bolt is also provided with a stop member such as a pin 6 that extends transversely through the bolt 1 and is disposed at the opposite end of the bolt. As clearly shown in Figure 2, the pin is large in diameter and has its sides cut away as at 7 for a purpose hereinafter described.

The license plate 8 has slots 9 therein for receiving the bolts 1. As clearly shown in Figure 1 I provide two devices for each license plate. The part indicated in Figure 2 by B is the part that clamps the license plate to the bracket and locks the plate in place. This part comprises a washer 10 that has a projection 11 extending transversely across the outer surface of the washer. This projection has cam-shaped sides 12, these sides being received in the slots 9, and bearing against the walls of the slots. It will therefore be seen that the washer is especially constructed so as to clamp the license plate 8 to the bracket and prevent the rattling of the license plate after it has once been clamped in place. The washer has slots 13 that extend entirely therethrough. These slots receive the projecting ends of the pin 6. The pin 6 is provided with flat sides 7 so as to permit the pin to be received in the slots 13. If the pin 6 were not provided with flat sides, the slots 13 would have to be large and would materially weaken the washer 10.

The washer 10 is connected to a knurled nut 14 by means of a coil spring 15. The spring 15 is snugly received in a recess 16 in the washer 10 and in a recess 17 in the nut 14, whereby the three parts, i. e., the washer, the nut and the spring, are permanently secured together.

In Figure 3 I show the knurled nut 14 as being provided with two slots 18 that extend through the entire length of the nut. These slots are adapted to receive the pin 6 when the part B is placed upon the bolt 1. I also provide two additional recesses 19 for receiving the pin 6. The recesses are disposed diametrically opposite each other and are spaced 90° from the slots 18. The spring 15 permits the knurled nut 14 to be moved toward the washer 10 so as to permit the pin 6 to pass entirely through the slots 18 whereupon the pin may be received in the recesses 19 after the knurled nut has been rotated through an arc of 90°. It is obvious that the recesses 19 do not have to be spaced 90° from the slots 18. If desired, the slots 18 themselves could be provided with recesses so that the walls of the recesses could act as stops for the pin 6. I have found it preferable, however, to space the recesses 19 90° away from the slots 18 in order to permit the knurled nut 14 to be rotated in either direction through the least possible distance in order to cause the pin 6 to be received in the recesses. Furthermore the walls of the recesses 19 prevent rotation of the knurled nut 14 with respect to the bolt 1.

From the foregoing description of the various parts of the device, the operation thereof may be readily understood.

The bolts 1 are inserted through the openings 2 of the license bracket 3 in a manner heretofore described. The license plate 8 is then disposed upon the bolts and is moved into contact with the license bracket. I then dispose the part B upon each of the bolts 1 and rotate the part B with respect to the bolts 1 so as to dispose the projections 11 of the washers 10 in the slots 9. As long as the projections 11 are in the slots 9 it will be apparent that the washers 10 are held against rotation with respect to the license plate and also clamp the license plate in position. In disposing the parts B upon the bolts 1 the slots 13 and 18 are aligned with the pins 6 so as to permit the part B to be moved onto the bolts. When manufacturing this device, the springs 15 will connect the washers 10 and the nuts 14 so as to align the slots 13 with the slots 18.

After the parts B have been disposed upon the bolts 1 so as to seat the projections 11 in the slots 9, the nuts 14 are moved inwardly so as to compress the springs 15 and cause the pins 6 to ride free of the slots 18. The nuts 14 may now be rotated so as to align the pins with the recesses 19, whereupon the nuts may be released and the springs 15 will instantly seat the pins 6 in the recesses 19. The operation just described may be quickly accomplished and provides a novel means for locking the license plate to the bracket. Moreover, the part B may be just as quickly removed from the bolt 1 as it is applied to the bolt. The device will be plated, such as nickel plated, so as to make it rust-proof and at the same time present a device having an artistic appearance.

I claim:

1. A device of the type described comprising a bolt, said bolt being adapted to receive and to support a license plate, a washer carried by said bolt and having wedge-shaped means for engaging with the license plate so as to prevent movement of the license plate with respect to the bolt, and spring means for yieldingly holding said washer in contact with the license plate.

2. A device of the type described comprising a bolt, said bolt being adapted to receive and to support a license plate, a washer carried by said bolt and having wedge-shaped means for engaging with the license plate so as to prevent movement of the license plate with respect to the bolt, spring means for yieldingly holding said washer in contact with the license plate, a nut slidably received upon said bolt, said bolt having stop members adapted to operatively engage with said nut so as to prevent the rotation of said nut, said nut bearing against said spring means so as to cause said spring means to bear against said washer.

3. A device of the type described comprising a bolt having stop members thereon, said bolt being adapted to receive and to support a license plate, a washer slidably received on said bolt and having a wedge-shaped portion for engaging with the wall of the opening in the license plate so as to prevent the movement of the license plate with respect to the bolt, a nut slidably received on said bolt and being normally locked against rotation by said stops, and spring means disposed between said nut and said washer, whereby said washer is yieldingly held in contact with the license plate.

4. A device of the type described comprising a member for supporting a license plate, clamping means removably carried by said member for securing the license plate to said member, said clamping means including a washer adapted to contact with the license plate, a nut, and a coil spring connecting said nut to said washer and also being adapted to yieldingly hold said washer in contact with the license plate, locking means carried by said member, said spring being adapted to move said nut into engagement with the locking means.

FRANK KUHN.